(No Model.)

2 Sheets—Sheet 1.

W. H. BELL, Sr.
Revolving Fire Arm.

No. 228,859.

Patented June 15, 1880.

WITNESSES,
Robert S. Rowe, M.D.
D. Wood Bell

INVENTOR.
William H. Bell Sr.

(No Model.) 2 Sheets—Sheet 2.
W. H. BELL, Sr.
Revolving Fire Arm.
No. 228,859. Patented June 15, 1880.
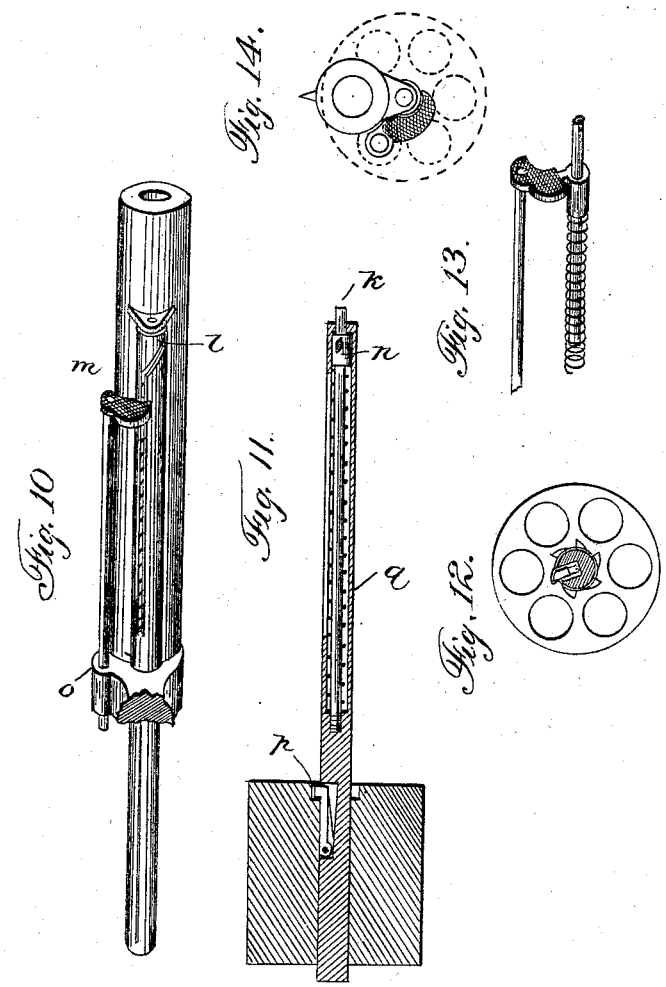
WITNESSES.
INVENTOR.

UNITED STATES PATENT OFFICE.

WILLIAM H. BELL, SR., OF BALTIMORE, MARYLAND.

REVOLVING FIRE-ARM.

SPECIFICATION forming part of Letters Patent No. 228,859, dated June 15, 1880.

Application filed April 15, 1880. (No model.)

*To all whom it may concern:*

Be it known that I, WILLIAM H. BELL, Sr., of Baltimore, in the county of Baltimore and State of Maryland, have invented a new and useful Improvement in Shell-Extractors for Fire-Arms; and I do hereby declare that the following is a full, clear, and exact description of the same.

The invention relates to devices for ejecting shells of cartridges from the chambers of revolving fire-arms, and has for its object the ejecting of shells with the least possible inconvenience and in such a manner as to be almost automatic.

The invention consists, essentially, of a plunger-rod or ejector connected to a lever, so that the act of pushing the rod into the chamber will cause the lever to revolve the cylinder in such a manner as to bring each chamber successively in line with said rod.

It consists, also, of details of construction hereinafter fully explained.

Figure 1:
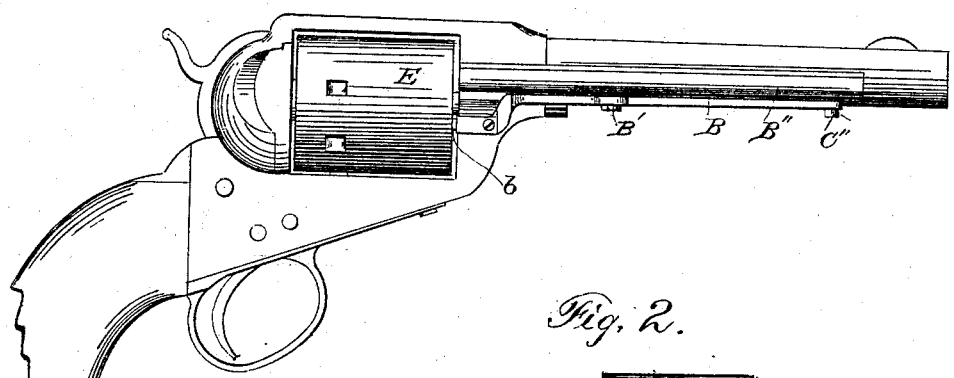
Figure 2:
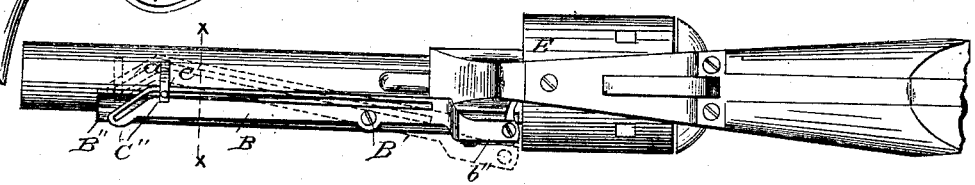
Figure 3:
Figures 4, 5:
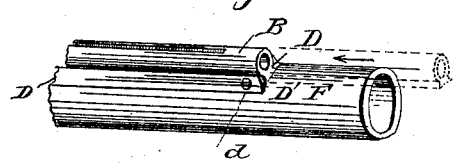
Figure 6:
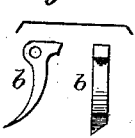
Figure 7:
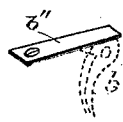
Figure 8:
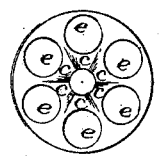
Figure 9:
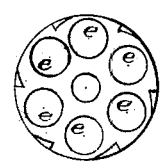

In the drawings hereunto annexed, and forming part of this specification, Figure 1, Sheet 1, shows a side elevation of a revolver embracing my improvement. Fig. 2, Sheet 1, is a view of the under side, showing the lever in position. Fig. 3, Sheet 1, represents the lever detached, with pawl and spring attached. Fig. 4, Sheet 1, shows a section of Fig. 2 on line $x\ x$. Fig. 5, Sheet 1, represents portion of barrel and tube, showing the dovetailed groove and manner of inserting the tube. Fig. 6, Sheet 1, view of the pawl. Fig. 7, Sheet 1, represents the spring for forcing pawl into position; Fig. 8, Sheet 1, front of cylinders with notches, in which the pawl engages. Fig. 9, Sheet 1, is a modification showing notches cut on outside or outer edge of the cylinder; Fig. 10, Sheet 2, a modification in which the leverage is obtained by means of the central rod, on which the cylinder revolves. Fig. 11, Sheet 2, represents a section through the cylinder and central rod, showing the pawl and notches in cylinder, also the steadying-post on which the finger-piece slides up and down. Fig. 12, Sheet 2, is a section of the central rod just in front of cylinder, showing notches and manner in which the pawl engages with the same. Fig. 13, Sheet 2, shows detached portions of steadying-rod, ejector, and the manner in which the thumb-piece plays on the steadying-rod. Fig. 14, Sheet 2, front view, showing the manner in which the finger-piece lies against the barrel.

The lever B is represented as attached by means of a screw, B', to a tube, B'', in which the rod A plays back and forth, or it can be attached to a stud on the side of the barrel F, and it is so arranged that when the upper end is lifted the lower portion next to the cylinder becomes depressed. On this lower end is placed a pawl, $b$, which plays freely, and is held in place by a screw or pin. A spring, $b''$, bears against this pawl and keeps it pressed against the front of the cylinder E.

The lever B is provided with a slot, $c$, which extends in a straight line, nearly to the lower end, the required distance, and at the upper it diverges at an angle of about forty-five degrees. Into this slot is inserted a pin or screw, $C''$, extending through and attached to the rod A or finger-piece $a$, as shown clearly in Fig. 4. This pin must play freely, so that it can follow the slot in the lever.

On the front of the cylinder is cut the required number of notches, $c$, in which the pawl $b$ engages for revolving the said cylinder.

The tube B'', in which the rod plays, is attached to the barrel F by means of a dovetailed groove, D, extending along the side of the barrel, a dovetail being formed on the tube B'' to correspond with the groove. It is inserted at the top and pushed down, as shown by dotted lines in Fig. 5, and when far enough it is retained in position by means of a screw or pin through the side, or it can be held in place by a spring, so as to be attached or detached instantly. The length and inclination of the diverging slot are proportioned to the length of the arms of the lever, so that the movement of the pin carried by the sliding ejector-rod shall turn the cylinder just enough to bring the proper chamber into line with the said ejector-rod.

The operation of this ejector is as follows: Supposing the chambers to be filled with empty shells, the pistol being at half-cock, the operator takes hold of the finger-piece with the finger and thumb and pulls it down toward the cylinder. The first effect of this movement is to cause the screw or pin in the slot to move down the inclined part and at the same time cause the upper end of the lever to rise as the said pin passes through the incline. The lower end having the pawl attached is by that movement depressed, and the pawl, being engaged with one of the notches in the cylinder causes it to revolve. Just at this point the rod enters the chamber, and the pin, now following the straight part of the slot, ceases to turn the cylinder and allows the rod to continue on through the chamber until the shell is pushed out. The finger-piece, being pushed up in its place again, causes the lever to return to its first position, permitting the pawl to become engaged with the succeeding notch in face of the cylinder, and so on until all the shells are ejected. The whole number of shells can be ejected in a second, and the device is rendered nearly as efficient as if automatic.

However quickly the operation is performed, it is impossible to turn the cylinder so that it will miss a shell, from the fact that the point of the rod enters the front of the chamber the instant it is opposite, thereby locking it and preventing any further revolution until the operation is repeated.

If necessary, a spring can be used to drive the rod back, but the device can be used without it with great facility.

The lever may be placed on the side and the lower end constructed with the pawl or spring to catch in notches cut on the side or outer edge of the cylinder, as shown in Fig. 9.

It is evident that the nearer the cylinder the screw on which the lever plays is placed the greater the leverage, and there can be a series of holes made in the lever with corresponding ones in the barrel or tube, so that the leverage can be regulated without altering the position of the lever.

This arrangement can be applied to all revolvers now having the plunger attached with a very small outlay, or can be manufactured complete at comparatively small cost.

In the modification shown in Sheet 2, I use the central pivoted rod, on which the cylinder revolves, as a medium of leverage for revolving the cylinder. The upper portion is made tubular, while the part running through the cylinder is solid, and into this tube is fitted a steadying-rod, $k$, which extends out and through the top and forms a pivot, on which the central rod turns. The finger-piece slides up and down on this steadying-rod.

In the side of the central pivotal rod, in the tubular part thereof, is a slot inclined at its upper end, as shown at $l$. The finger-piece $m$ extends through this slot and embraces the rod $k$, or a pin can pass through the finger-piece and be attached to the collar $n$, that slides freely on this central rod, and the ejecting-rod is fastened to the finger-piece $m$ directly opposite the chamber next to the barrel, and is supported in proper guide $o$. When the finger-piece is pushed down this rod enters the chamber and passes through and out at the rear, thereby ejecting the shell.

On the central rod, which passes through the cylinder, and on which it revolves, is placed a pawl or click, $p$, which is made so as to enter the hole in the center of the cylinder and press against the side, so as to engage with the notches cut on the outer edge and in the hole. This pawl is so constructed as to allow being depressed even with or below the surface of the central rod and remain until it comes before one of the notches, when the spring forces it into the notch.

The operation of this modification is substantially the same as that of the form shown heretofore.

The finger-piece, being pressed down, will cause the pivotal rod to turn along the path of the spiral slot. At the same time the pawl, being engaged in one of the notches in the cylinder, causes the cylinder to revolve and the chambers to stop in line with the ejector at the point where the rod enters the chamber, and while the finger-piece follows the straight slot the ejector will travel through the chamber far enough to eject the shell and return to the point where the slot inclines without further movement of the cylinder; but when it comes in contact with the inclined portion of the slot the central rod is turned back and the pawl is brought into engagement with the next notch in the cylinder, and the operation may be repeated until all the shells are ejected.

This whole arrangement can be covered, leaving only the finger-piece exposed, making it very compact.

A spiral spring, $q$, can be used, if necessary, as shown in Fig. 11, to return the finger-piece to its proper position.

Having thus described my invention, what I claim as my invention is—

The combination of the ejector-rod A and the slotted lever B, the lever and the rod being connected by a pin moving in the slot, and the lever operating upon the cylinder by a pawl-and-ratchet connection, whereby the cylinder is rotated and the shell ejected by the same movement of the rod.

In testimony whereof I have signed my name to this specification in the presence of two subscribing witnesses.

WILLIAM H. BELL, Sr.

Witnesses:
FRANK MIDDLETON,
C. N. ATWOOD.